March 24, 1942.  E. F. PALMER  2,277,251
PACKING WASHER
Filed Jan. 16, 1941
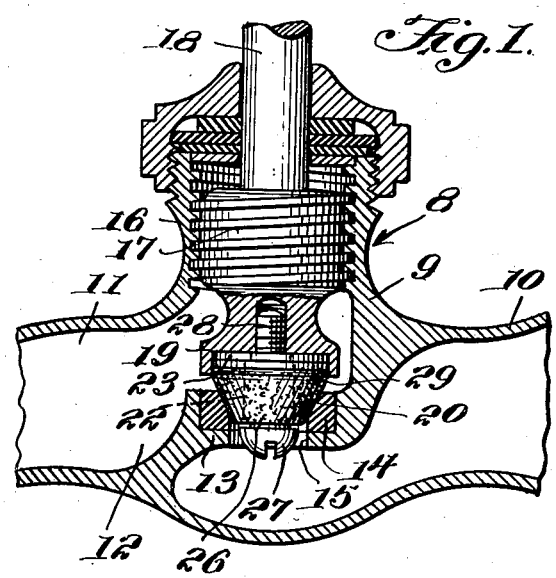
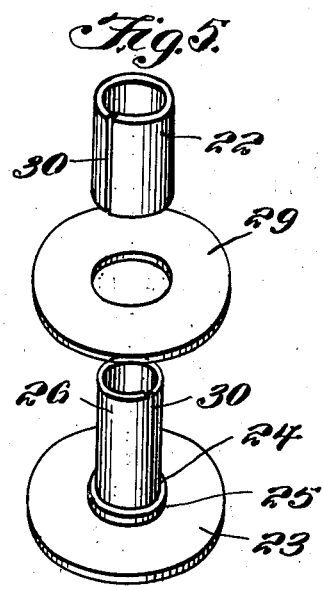
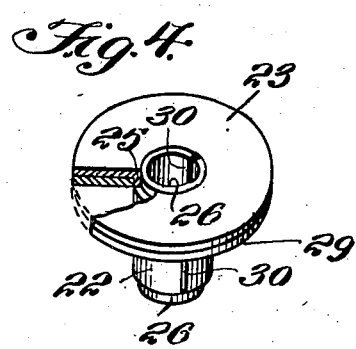
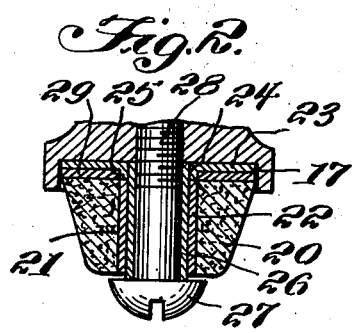
Edson F. Palmer
INVENTOR
BY Victor J. Evans & Co.
ATTORNEYS
WITNESS J. T. L. Wright Patented Mar. 24, 1942

2,277,251

UNITED STATES PATENT OFFICE 2,277,251

PACKING WASHER

Edson F. Palmer, Waterbury, Vt.

Application January 16, 1941, Serial No. 374,778

2 Claims. (Cl. 251—160)

The present invention relates to improvements in packing washers for cocks, faucets and similar valve mechanisms.

An important object of the invention is to provide an improved means for mounting packing washers on the stem of a faucet valve or the like which will materially add to the life of such washers thereby alleviating the necessity of frequently replacing them as they become worn.

A further object of the invention is to mount the packing washer on the stem of a faucet valve or the like in such a manner that the washer will not turn on the valve seat as the valve stem is rotated, thereby relieving the washer of the major portion of wear to which it is usually subjected.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a vertical sectional view of a typical faucet valve showing a washer in accordance with the present invention thereon.

Figure 2 is an enlarged fragmentary sectional view of the lower portion of the valve stem and through the washer with the latter in the position shown at Figure 1.

Figure 3 is a top plan view of the washer mounting with the attaching screw removed.

Figure 4 is a perspective view with parts in section illustrating the support for the washer.

Figure 5 is an exploded perspective view of the washer support.

Referring to the drawing for a more detailed description thereof, the faucet illustrated in Figure 1 of the drawing and generally designated by the reference numeral 8 is of conventional construction and forms no part of the present invention, the same being shown merely for illustrative purposes as a typical faucet to which the valve packing washer may be applied. The faucet 8 comprises a body 9 one end 10 of which is adapted to be attached to a fluid conduit and the other end 11 fixed with an outlet nozzle or spout, not shown. A chamber 12 is formed in the body, the same being divided by a diaphragm 13 formed with an annular seat 14 which surrounds the orifice 15, said orifice connecting the ends 10 and 11.

The body 9 is formed with an upstanding portion 16, the same being internally threaded for receiving the threaded end 17 of a valve stem 18. The lower end of the valve stem 18 is conventionally formed with an annular recessed portion 19 adapted to retain a packing washer 20, said washer being formed of a relatively soft material such as rubber or the like and movable with the valve stem for opening and closing the orifice 15. In accordance with the present invention, a special means is provided for mounting the washer 20 in the recess 19 so that when the washer is in contact with the seat 14, as shown in Figure 1 of the drawing, it will remain stationary as the valve stem 18 is rotated to tighten the valve on the seat. The washer 20 is formed with a central opening or bore 21 in which is fitted a metal ferrule 22 having a length equal to the thickness of the washer. A metal disk 23 provided with a central aperture 24 is fitted within the annular recess 19 of the stem and against the end surface of the stem. The disk is formed with an annular flange 25 about the edge of the opening 24, the said flange being directed outwardly with relation to the stem.

A second ferrule 26 extends through the first ferrule 22 and is fitted on the extension portion of a retaining screw 28 detachably connected with the stem. The inner threaded portion of the screw 28 engages an interiorly threaded bore in the center of the stem while the outer end is formed with an enlarged head 27. A second disk 29 is mounted at the inner end of the washer and provides a bearing between the washer and the inner disk 23. The disk 24 has an external diameter corresponding to that of the complementary disk and has a central opening of a size enabling the outer disk to be fitted in a position about the flange 25.

As shown to advantage at Figure 2, the inner ferrule 26 is of a length exceeding the thickness of the washer 20 and the disks 23 and 29, and is firmly held on the retaining screw between the head 27 thereof and the inner end surface of the valve stem. The outer shorter ferrule 22 is disposed in axial alignment with the flange 25 and so that its inner end may abut the outer edge of the flange. This mounting of the washer enables the washer together with the outer ferrule 22 to freely rotate about the axis of the retaining screw, so that when the valve is in fully closed position the inner ferrule protrudes slightly beyond the washer and the outer ferrule and the washer assume non-rotary connection with the supporting seat though the stem and retaining screw be rotated during contact of the washer with the seat. When the valve stem is rotated sufficiently to raise the valve 20 from its seat the valve together with the outer ferrule 22 gravitates to a downward position supported on the head 27 of the retaining screw. However, when the packing washer contacts the seat 14 the same will remain stationary as the valve stem 18 is rotated to tighten the valve on the seat. This will materially relieve the washer of a major portion of the wear and tear to which it is ordinarily subjected thereby adding to the life of the washer and rendering it unnecessary to frequently change the same. The metal discs 23 and 29, respectively, protect the rear face of the washer from unusual wear in the annular recess 19.

If desired, the ferrules 22 and 26, respectively, may be split longitudinally as indicated at 30 to lower the production costs thereof.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A washer for connection with the end of a valve stem having a retaining screw engaging a threaded bore in the stem comprising a washer body having a central bore therethrough, a ferrule having a length approximately equal to the thickness of the washer fitted in the bore of the said washer, a longer ferrule disposed within the first mentioned ferrule and adapted to be fitted on the stem retaining screw, a disk having a central opening fitted about the inner end of the said longer interior ferrule, the said disk having an annular outwardly directed flange formed about the center opening thereof, and an outer disk having a central opening, the said outer disk disposed parallel with and adjacent the first mentioned inner disk with the edge of the center opening extending about the flange, the outer shorter ferrule being mounted so that its outer end is flush with the outer end of the washer body and its inner end abuts the outer edge of the flange so that the body with the outer ferrule is rotatable and axially slidable about the shank of the retaining screw between the end of the stem and the head of the screw.

2. A packing washer for valves, comprising a washer body having a central opening therethrough adapted for attachment to the end of a valve stem, a ferrule mounted within the said opening, a second ferrule disposed within the said first ferrule, a disk having a central opening adapted to be fitted against the end of the valve stem and about the inner end of the said inner ferrule, a flange formed on the said disk about the opening and the ferrule and directed outwardly therefrom, the said outer ferrule having its outer end flush with the outer side of the washer and its inner end disposed to abut the outer end of the flange, the said inner ferrule being of a length to extend beyond the outer side of the washer and the outer ferrule when the washer is in seated position, and means for attaching the said washer body, ferrules and disk to the end of the valve stem.

EDSON F. PALMER.